(12) United States Patent
Tsutsui

(10) Patent No.: US 10,541,400 B2
(45) Date of Patent: Jan. 21, 2020

(54) SECONDARY BATTERY

(71) Applicant: TOYOTA JIDOSHA KABUSHIKI KAISHA, Toyota-shi, Aichi-ken (JP)

(72) Inventor: Emi Tsutsui, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 117 days.

(21) Appl. No.: 15/711,387

(22) Filed: Sep. 21, 2017

(65) Prior Publication Data

US 2018/0090732 A1  Mar. 29, 2018

(30) Foreign Application Priority Data

Sep. 27, 2016 (JP) ................. 2016-188517

(51) Int. Cl.
| | |
|---|---|
| H01M 2/16 | (2006.01) |
| H01M 10/04 | (2006.01) |
| C08F 10/02 | (2006.01) |
| C08F 10/06 | (2006.01) |
| H01M 10/42 | (2006.01) |
| H01M 10/0525 | (2010.01) |
| H01M 4/02 | (2006.01) |

(52) U.S. Cl.
CPC .......... *H01M 2/1653* (2013.01); *H01M 2/16* (2013.01); *H01M 2/166* (2013.01); *H01M 2/1646* (2013.01); *H01M 2/1673* (2013.01); *H01M 2/1686* (2013.01); *H01M 10/04* (2013.01); *H01M 10/4235* (2013.01); *C08F 10/02* (2013.01); *C08F 10/06* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 7,399,555 B2 * | 7/2008 | Sano | ........... H01M 2/06 429/129 |
| 2003/0118896 A1 * | 6/2003 | Yamaguchi | ...... H01M 2/1653 429/145 |

(Continued)

FOREIGN PATENT DOCUMENTS

| | | |
|---|---|---|
| JP | 2001-273880 A | 10/2001 |
| JP | 2008-311220 A | 12/2008 |

(Continued)

*Primary Examiner* — Scott J. Chmielecki
(74) *Attorney, Agent, or Firm* — Sughrue Mion, PLLC

(57) ABSTRACT

A secondary battery includes an electrode body and an electrolytic solution, the electrode body including a positive electrode, a negative electrode, and a separator. The separator includes a resin substrate that has a multi-layer structure including a porous polyethylene layer and a porous high melting point resin layer, the porous polyethylene layer including a polyethylene resin and being disposed to face the negative electrode, and the porous high melting point resin layer including a resin having a higher melting point than the polyethylene resin. The porosity of the porous polyethylene layer is 2% to 5%. A ratio of the thickness of the porous polyethylene layer to the total thickness of the resin substrate is 0.048 to 0.091.

9 Claims, 2 Drawing Sheets

(56) References Cited

U.S. PATENT DOCUMENTS

| | | | | |
|---|---|---|---|---|
| 2005/0130037 A1* | 6/2005 | Kaneta | ............... | H01M 2/0207 |
| | | | | 429/178 |
| 2005/0147888 A1* | 7/2005 | Yamamoto | .............. | H01M 4/13 |
| | | | | 429/231.1 |
| 2005/0221172 A1* | 10/2005 | Kato | ................... | H01M 2/1653 |
| | | | | 429/144 |
| 2010/0239900 A1* | 9/2010 | Take | ................... | H01M 2/1653 |
| | | | | 429/144 |
| 2013/0251890 A1* | 9/2013 | Lee | ................... | B01D 67/0004 |
| | | | | 427/58 |
| 2014/0308567 A1* | 10/2014 | Nishikawa | ........... | H01M 2/027 |
| | | | | 429/145 |
| 2015/0050541 A1* | 2/2015 | Kinoshita | ........... | H01M 2/1646 |
| | | | | 429/144 |
| 2016/0226050 A1* | 8/2016 | Abe | ....................... | H01G 11/52 |
| 2017/0012264 A1* | 1/2017 | Carlson | ................. | H01M 2/166 |
| 2017/0092915 A1* | 3/2017 | Ku | ......................... | C08L 53/00 |
| 2017/0092922 A1* | 3/2017 | Hommura | ........... | H01M 2/1653 |
| 2017/0149039 A1* | 5/2017 | Shon | ................... | H01M 2/1653 |
| 2017/0331147 A1* | 11/2017 | Woehrle | ................ | H01M 2/145 |
| 2019/0022634 A1* | 1/2019 | Jeong | .................... | D04H 1/728 |
| 2019/0058217 A1* | 2/2019 | Ahn | ....................... | H01M 2/16 |

FOREIGN PATENT DOCUMENTS

| | | |
|---|---|---|
| JP | 2013-157136 A | 8/2013 |
| JP | 2014-223812 A | 12/2014 |

\* cited by examiner

SECONDARY BATTERY

INCORPORATION BY REFERENCE

The disclosure of Japanese Patent Application No. 2016-188517 filed on Sep. 27, 2016 including the specification, drawings and abstract is incorporated herein by reference in its entirety.

BACKGROUND

1. Technical Field

The present disclosure relates to a secondary battery.

2. Description of Related Art

A typical secondary battery includes an electrode body and an electrolytic solution, the electrode body including a positive electrode, a negative electrode, and a separator interposed between the positive and negative electrodes. The separator has a porous structure having pores. The separator insulates the positive and negative electrodes from each other and holds the electrolytic solution in the pores. As a result, an ion conductive path is formed between the positive and negative electrodes. Some separators have a shutdown function. In a separator having a shutdown function, when the internal temperature of a battery increases due to overcharging or the like, a constituent material melts and closes pores such that an ion conductive path between the positive and negative electrodes is blocked. Thus, a charge-discharge reaction of the battery is forcibly stopped, and an increase in the internal temperature of the battery is suppressed.

Examples of related art documents relating to a secondary battery that includes the above-described separator include Japanese Unexamined Patent Application Publication No. 2013-157136 (JP 2013-157136 A), Japanese Unexamined Patent Application Publication No. 2008-311220 (JP 2008-311220 A), and Japanese Unexamined Patent Application Publication No. 2001-273880 (JP 2001-273880 A). For example, JP 2013-157136 A discloses a secondary battery in which a separator having a three-layer structure of PP layer/PE layer/PP layer is used. In this three-layer structure, a porous polypropylene layer (PP layer) is laminated on each of opposite sides of a porous polyethylene layer (PE layer). In the secondary battery disclosed in JP 2013-157136 A, the PE layer disposed in the center portion melts so as to block an ion conductive path between the positive and negative electrodes before the PP layers disposed on the opposite sides of the PE layer melts.

SUMMARY

According to an investigation by the present inventor, during the period from the start to the end of a shutdown of a separator, a current is concentrated on a portion which is not shut down. Therefore, an increase in the internal temperature of a battery is accelerated. Therefore, from the viewpoint of improving overcharge resistance, it is preferable that, by rapidly closing pores of a separator, the time from the start to the end of a shutdown, in other words, the time taken to block an ion conductive path between positive and negative electrodes is reduced as much as possible. The disclosure provides a secondary battery having superior overcharge resistance in which an increase in the internal temperature of the battery is suppressed.

A first aspect of the disclosure relates to a secondary battery including: an electrode body including a positive electrode, a negative electrode, and a separator interposed between the positive electrode and the negative electrode; and an electrolytic solution. The separator includes a resin substrate that has a multi-layer structure including a porous polyethylene layer and a porous high melting point resin layer, the porous polyethylene layer including a polyethylene resin and being disposed to face the negative electrode, and the porous high melting point resin layer including a resin having a higher melting point than the polyethylene resin. The porosity of the porous polyethylene layer is 2% to 5%. A ratio of the thickness of the porous polyethylene layer to the total thickness of the resin substrate is 0.048 to 0.091.

In the secondary battery, when the internal temperature of the secondary battery increases due to overcharging or the like, the porous polyethylene layer functions as a so-called shutdown layer. That is, when the internal temperature of the secondary battery increases, the pores of the porous polyethylene layer are rapidly closed, and the ion conduction between the positive and negative electrodes is rapidly blocked. This way, in the porous polyethylene layer, the time from the start to the end of a shutdown can be reduced. Therefore, an increase in the internal temperature of the battery can be suppressed, and overcharge resistance can be improved. In addition, the interconnection properties of the separator (connection of the pores in the laminating direction) can be secured, and high ion conductivity can be secured during normal use.

The porosity (%) of the porous polyethylene layer can be calculated from the following Expression (1): $((V1-V0)/V1) \times 100$. Here, $V1$ represents the apparent volume ($cm^3$) of the porous polyethylene layer. $V0$ represents a ratio of the mass $M$ (g) of the porous polyethylene layer to the true density $\rho$ ($g/cm^3$) of the resin constituting the porous polyethylene layer, that is, $M/\rho$ ($cm^3$). In other words, $V0$ represents the solid volume of the resin in the mass M. Here, the method of calculating the porosity of the porous polyethylene layer has been described as an example. Using this method, the porosity of each of the layers constituting the resin substrate can also be obtained. In addition, the porosity of each of the layers in the separator can also be measured using, for example, an X-ray CT scanner. The porosity is expressed by "vol %" but, in this specification, is simply expressed by "%".

The porous high melting point resin layer may be a porous polypropylene layer, and the resin substrate may have a two-layer structure including the porous polyethylene layer and the porous polypropylene layer. As a result, the configuration of the separator can be made simple.

The total thickness of the resin substrate may be 5.5 μm to 22 μm. As a result, high ion conductivity can be realized, and mechanical strength can be improved. Therefore, battery characteristics during normal use and durability can be further improved.

The porosity of the porous high melting point resin layer may be higher than the porosity of the porous polyethylene layer. As a result, the electrolytic solution permeability and moisture retaining properties of the separator can be improved, and ion conductivity during normal use can be improved.

A second aspect of the present disclosure relates to a separator that includes a resin substrate having a multi-layer structure, the resin substrate including: a porous polyethylene layer including a polyethylene resin; and a porous high melting point resin layer including a resin having a higher melting point than the polyethylene resin. The porosity of the porous polyethylene layer is 2% to 5%. A ratio of the thickness of the porous polyethylene layer to the total thickness of the resin substrate is 0.048 to 0.091.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
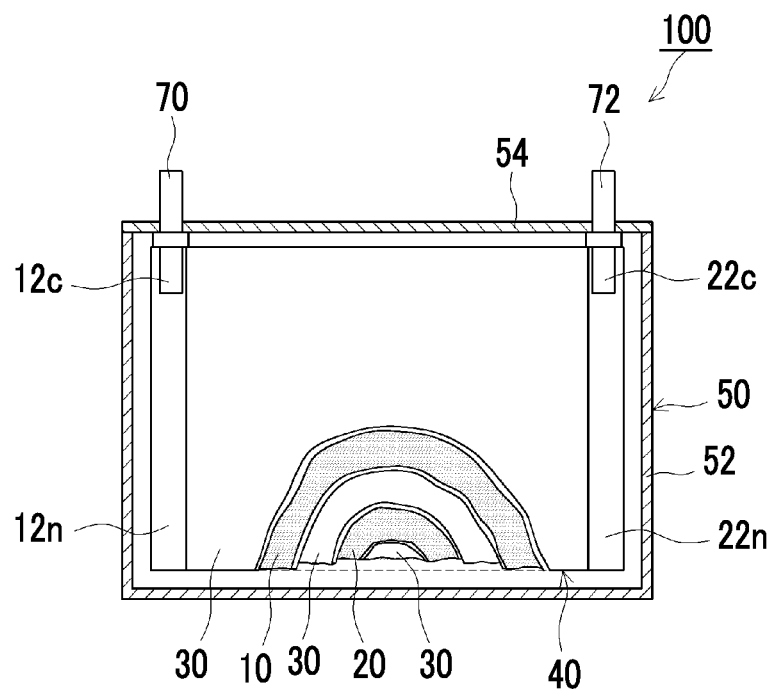
FIG. 1 is a longitudinal sectional view schematically showing an internal configuration of a secondary battery according to an embodiment of the disclosure.

Hereinafter, an embodiment of the disclosure will be described with reference to the drawings. Matters (for example, components of a battery or a general construction process of a battery which is not a characteristic of the disclosure) necessary to practice the disclosure other than those specifically referred to in this specification may be understood as design matters based on the related art in the pertinent field for a person of ordinary skills in the art. The disclosure can be practiced based on the contents disclosed in this specification and common technical knowledge in the pertinent field. In the following drawings, parts or portions having the same function are represented by the same reference numerals, and the repeated description will not be made or will be simplified. In each drawing, a dimensional relationship (for example, length, width, or thickness) does not necessarily reflect the actual dimensional relationship.

Although the present disclosure is not particularly limited thereto, a secondary battery 100 shown in FIG. 1 will be described hereinafter as an example. In the secondary battery 100 shown in FIG. 1, an electrode body 40 and an electrolytic solution (not shown) are accommodated in a battery case 50.

Figure 2:
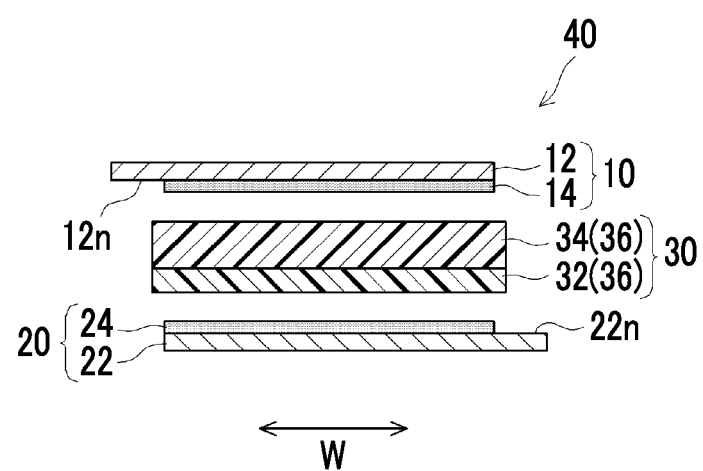
FIG. 2 is a sectional view schematically showing a configuration of major components of an electrode body of the secondary battery according to the embodiment.

FIG. 2 is a sectional view schematically showing a configuration of major components of the electrode body 40. As shown in FIG. 2, the electrode body 40 includes a positive electrode 10, a negative electrode 20, and a separator 30 interposed between the positive electrode 10 and the negative electrode 20. The electrode body 40 may be a so-called laminated electrode body obtained by laminating a rectangular positive electrode and a rectangular negative electrode with a separator interposed therebetween, or may be a wound electrode body obtained by laminating an elongated sheet-shaped positive electrode and an elongated sheet-shaped negative electrode with a separator sheet interposed therebetween and winding the obtained laminate in a longitudinal direction.

The positive electrode 10 includes a positive electrode current collector 12 and a positive electrode active material layer 14 that is formed on a surface of the positive electrode current collector 12. As the positive electrode current collector 12, a conductive member formed of highly conductive metal (for example, aluminum or nickel) is preferably used. The positive electrode active material layer 14 is formed on the surface of the positive electrode current collector 12 to have a predetermined width. In one end portion of the positive electrode current collector 12 in a width direction W, a positive electrode active material layer non-forming portion 12$n$ on which the positive electrode active material layer 14 is not formed is provided.

The positive electrode active material layer 14 includes a positive electrode active material. As the positive electrode active material, for example, a lithium transition metal composite oxide such as $LiNiO_2$, $LiCoO_2$, $LiMn_2O_4$, $LiNi_{1/3}Co_{1/3}Mn_{1/3}O_2$, or $LiNi_{0.5}Mn_{1.5}O_4$ is preferable. The positive electrode active material layer 14 may further include components other than the positive electrode active material, for example, a conductive material or a binder. Examples of the conductive material include a carbon material such as carbon black (for example, acetylene black or Ketjen black), activated carbon, or graphite. Examples of the binder, include a vinyl halide resin such as polyvinylidene fluoride (PVdF); and a polyalkylene oxide such as polyethylene oxide (PEO).

The negative electrode 20 includes a negative electrode current collector 22 and a negative electrode active material layer 24 that is formed on a surface of the negative electrode current collector 22. As the negative electrode current collector 22, a conductive member formed of highly conductive metal (for example, copper or nickel) is preferably used. The negative electrode active material layer 24 is formed on the surface of the negative electrode current collector 22 to have a predetermined width. In one end portion of the negative electrode current collector 22 in the width direction W, a negative electrode active material layer non-forming portion 22$n$ on which the negative electrode active material layer 24 is not formed is provided.

The negative electrode active material layer 24 includes a negative electrode active material. As the negative electrode active material, for example, a graphite-based carbon material such as natural graphite, artificial graphite, amorphous coated graphite (graphite particles having a surface coated with amorphous carbon) is preferable. The negative electrode active material layer 24 may further include components other than the negative electrode active material, for example, a thickener or a binder. Examples of the thickener include a cellulose such as carboxymethyl cellulose (CMC) or methyl cellulose (MC). Examples of the binder include: a rubber such as styrene-butadiene rubber (SBR); and a vinyl halide resin such as polyvinylidene fluoride (PVdF).

The separator 30 is disposed between the positive electrode active material layer 14 of the positive electrode 10 and the negative electrode active material layer 24 of the negative electrode 20. The separator 30 insulates the positive electrode active material layer 14 and the negative electrode active material layer 24 from each other. During normal use of the secondary battery 100, the separator 30 holds the electrolytic solution in the pores and forms an ion conductive path between the positive electrode active material layer 14 and the negative electrode active material layer 24. In other words, the separator 30 is configured to allow permeation of charge carriers included in the electrolytic solution. The separator 30 has a shutdown function of softening or melting to close the pores and blocking permeation of charge carriers when the internal temperature of the secondary battery 100 increases.

The separator 30 includes a resin substrate 36. In the technique disclosed herein, the resin substrate 36 has a multi-layer structure and includes at least a porous polyethylene layer 32 and a porous high melting point resin layer 34. The separator 30 shown in FIG. 2 includes the porous polyethylene layer 32 and the porous high melting point resin layer 34. In other words, the separator 30 shown in FIG. 2 includes the resin substrate 36. The porous polyethylene layer 32 is disposed to face the negative electrode active material layer 24 of the negative electrode 20. According to the investigation by the present inventor, a temperature at which heat starts to be generated in the negative electrode 20 is lower than that in the positive electrode 10. In other words, the negative electrode 20 reaches a high temperature at an earlier stage during overcharging. By disposing the porous polyethylene layer 32 to face the negative electrode 20, the shutdown function is effectively exhibited, and the effects of the technique disclosed herein can be exhibited more favorably.

The porous polyethylene layer 32 is a shutdown layer which softens or melts before the porous high melting point resin layer 34 softens or melts when the internal temperature of the secondary battery 100 increases. The porous polyethylene layer 32 includes a polyethylene resin. The polyethylene resin is a resin whose major monomer (a major component that accounts for the highest proportion among monomers) is ethylene. In this resin, a copolymerization ratio of ethylene is preferably higher than 50 mass %. Examples of the polyethylene resin include linear low-density polyethylene (LLDPE), branched low-density polyethylene (LDPE), medium-density polyethylene (MDPE), high-density polyethylene (HDPE), and an ethylene-propylene copolymer or an ethylene-vinyl acetate copolymer whose major monomer is ethylene.

The melting point of the polyethylene resin is higher than the upper limit of the temperature of the secondary battery 100 during normal use, and is typically 70° C. or higher (for example, 80° C. or higher). Therefore, during normal use of the secondary battery 100, the porous structure of the separator 30 is maintained, and the charge carriers can move smoothly between the positive electrode active material layer 14 and the negative electrode active material layer 24. In other words, an ion conductive path can be formed between the positive electrode 10 and the negative electrode 20. The melting point of the polyethylene resin is about 130° C. or lower, typically 120° C. or lower, and preferably 110° C. or lower (for example, 100° C. or lower). As a result, the shutdown function can be exhibited before the internal temperature of the secondary battery 100 increases significantly. As a result, an increase in the temperature can be suppressed. In general, the melting point of a resin can be measured by differential scanning calorimetry (DSC).

The porosity of the porous polyethylene layer 32 is 2% to 5%. As a result, overcharge resistance can be further improved. That is, when the internal temperature of the secondary battery 100 increases, the pores of the porous polyethylene layer 32 can be rapidly closed completely, and the ion conduction between the positive and negative electrodes can be rapidly blocked. As a result, an increase in the internal temperature of the secondary battery 100 can be further suppressed.

The thickness of the porous polyethylene layer 32 is not particularly limited, and is about 0.1 µm or more (for example, 0.5 µm or more) and is about 2 µm or less (for example, 1 µm or less). As a result, high ion conductivity can be realized, and the effects of the technique disclosed herein can be exhibited stably and more favorably.

The porous high melting point resin layer 34 includes a high melting point resin having a higher melting point than the polyethylene resin included in the porous polyethylene layer 32. Examples of the high melting point resin include a polyolefin resin such as a polypropylene resin, a polyvinyl chloride resin, a polyvinyl acetate resin, a polyimide resin, a polyamide resin, a cellulose, a polyether resin, a polyester resin, and a fluororesin. In addition, for example, in a case where a low melting point polyethylene resin such as LLDPE, LDPE, or an ethylene-propylene copolymer is used as the polyethylene resin in the porous polyethylene layer 32, a high melting point polyethylene resin such as HDPE or an ethylene-vinyl acetate copolymer can also be used as the high melting point resin in the porous high melting point resin layer 34. From the viewpoint of improving mechanical strength (for example, tensile strength or puncture strength) or chemical stability, it is preferable that the porous high melting point resin layer 34 includes a polyolefin resin. Here, "polyolefin resin" refers to all the compounds including a carbonyl unit in a main chain skeleton.

Here, the porous high melting point resin layer 34 is a porous polypropylene layer including a polypropylene resin. The polypropylene resin is a resin whose major monomer (a major component that accounts for the highest proportion among monomers) is propylene. In this resin, a copolymerization ratio of propylene is preferably higher than 50 mass %. Examples of the polypropylene resin include a homopolymer of propylene, and an ethylene-propylene copolymer (random copolymer or block copolymer) whose major monomer is propylene.

The melting point of the high melting point resin is not particularly limited as long as it is higher than that of the polyethylene resin included in the porous polyethylene layer 32. The melting point of the high melting point resin is higher than that of the polyethylene resin included in the porous polyethylene layer 32 by about 5° C. or higher, typically, 10° C. or higher, and preferably 20° C. or higher (for example, 30° C. or higher). As a result, when the porous polyethylene layer 32 functions as the shutdown layer, a shape of the porous high melting point resin layer 34 can be easily maintained. Therefore, short-circuiting between the positive electrode 10 and the negative electrode 20 can be further suppressed. In addition, the porous polyethylene layer 32 and the porous high melting point resin layer 34 include resins having different melting points, respectively. As a result, the shutdown function can be exhibited in two stages. In other words, the porous high melting point resin layer 34 favorably exhibits a function as a second shutdown layer, and higher overcharge resistance can be realized.

The melting point of the high melting point resin is about 100° C. or higher, typically 110° C. or higher, and preferably 130° C. or higher (for example, 150° C. or higher). As a result, the heat resistance of the separator 30 can be improved. The melting point of the high melting point resin is about 200° C. or lower, typically 180° C. or lower, and preferably 170° C. or lower (for example, 165° C. or lower). As a result, the porous high melting point resin layer 34 can favorably exhibit the function as the second shutdown layer.

The porosity of the porous high melting point resin layer 34 is not particularly limited and is preferably higher than the porosity of the porous polyethylene layer 32. The porosity of the porous high melting point resin layer 34 is higher than the porosity of the porous polyethylene layer 32 by about 5 times or higher and preferably 10 times or higher (for example, 20 times or higher). Specifically, the porosity of the porous high melting point resin layer 34 is about 35% or higher and typically 40% or higher (for example, 45% or higher) and is about 70% or lower and typically 65% or lower (for example, 60% or lower). As a result, during normal use of the secondary battery 100, electrolytic solution permeability and moisture retaining properties can be improved. As a result, superior ion conductivity can be realized. In addition, the mechanical strength and durability of the separator 30 can be improved.

The thickness of the porous high melting point resin layer 34 is not particularly limited, and is about 3 μm or more (for example, 5 μm or more) and is about 25 μm or less (for example, 20 μm or less). As a result, high ion conductivity can be realized, and mechanical strength and durability can be further improved.

In the technique disclosed herein, a ratio of the thickness of the porous polyethylene layer 32 to the total thickness of the resin substrate 36 is 0.048 to 0.091. In addition, in an aspect shown in FIG. 2, a ratio of the thickness of the porous polyethylene layer 32 to the thickness of the porous high melting point resin layer (that is, the porous polypropylene layer) 34 is 0.05 to 0.1. As a result, even in an aspect where the resin substrate 36 includes the porous polyethylene layer 32 having a low porosity, the interconnection properties of the separator 30 can be secured, and high ion conductivity can be realized. Therefore, a balance between battery characteristics during normal use and overcharge resistance can be further improved. The thickness of each of the layers in the separator 30 can be measured using, for example, an electron microscope (for example, a scanning electron microscope (SEM)). For example, the thickness of each of the layers in the separator 30 can be obtained by measuring the thicknesses of a plurality of positions and obtaining the average value thereof.

The total thickness of the resin substrate 36 is not particularly limited, and is about 5 μm or more and typically 5.5 μm or more (for example, 10 μm or more) and is about 50 μm or less, preferably 30 μm or less, and typically 25 μm or less (for example, 22 μm or less). By adjusting the total thickness of the resin substrate 36 to be the predetermined value or more, the mechanical strength (for example, tensile strength or puncture strength) and durability of the separator 30 can be improved. In addition, by adjusting the total thickness of the resin substrate 36 to be the predetermined value or lower, the ion conductivity is improved, and the high-rate charging-discharging characteristics of the secondary battery 100 can be improved.

The resin substrate 36 of the separator 30 may have a two-layer structure including the porous polyethylene layer 32 and the porous high melting point resin layer 34 as shown in FIG. 2, or may have a three-layer or more structure including one or more layers in addition to the porous polyethylene layer 32 and the porous high melting point resin layer 34. For example, one or more layers may be provided between the porous polyethylene layer 32 and the porous high melting point resin layer 34, or one or more layers may be provided on a surface of the porous polyethylene layer 32 which does not face the porous high melting point resin layer 34. In one specific example of the three- or more layer structure, the porous polyethylene layer 32, the porous high melting point resin layer 34, and another porous high melting point resin layer are laminated in this order.

In addition, in the separator 30, a heat resistant layer (HRL layer) having heat resistance and insulating properties may be provided on a surface of the resin substrate 36, for example, a surface of the porous high melting point resin layer 34 which does not face the porous polyethylene layer 32. The heat resistant layer includes inorganic compound particles (inorganic filler) such as alumina. The heat resistant layer is porous so as to allow permeation of charge carriers. Since the separator 30 includes the heat resistant layer, short-circuiting between the positive electrode 10 and the negative electrode 20 can be prevented, for example, even in a case where the internal temperature of the secondary battery 100 is higher than the melting point of the high melting point resin included in the porous high melting point resin layer 34 such that the resin substrate 36 shrinks or breaks.

In addition, each of the layers constituting the resin substrate 36 may be formed of the above-described resin component alone, or may further include a component other than the resin component, for example, an additive component such as a plasticizer or an antioxidant.

Typically, the electrolytic solution of the secondary battery 100 includes a solvent and a supporting electrolyte. The supporting electrolyte is dissociated in the solvent to form charge carriers. Examples of the solvent include nonaqueous solvents such as carbonates, esters, ethers, nitriles, sulfones, or lactones. Among these, carbonates such as ethylene carbonate (EC), diethyl carbonate (DEC), dimethyl carbonate (DMC), or ethyl methyl carbonate (EMC) are preferable. Examples of the supporting electrolyte include a lithium salt, a sodium salt, and a magnesium salt. Among these, a lithium salt such as $LiPF_6$ or $LiBF_4$ is preferable. The electrolytic solution may include a component other than the solvent and the supporting electrolyte, for example, various additives. Examples of the additives include: a gas producing agent such as biphenyl (BP) or cyclohexylbenzene (CHB); a film forming agent such as an oxalato complex compound including a boron atom and/or a phosphorus atom or vinylene carbonate (VC); a dispersant; and a thickener.

The battery case 50 of the secondary battery 100 includes: a flat rectangular (square) battery case body 52 having an open upper end; and a lid plate 54 that covers the opening. On a top surface (that is, the lid plate 54) of the battery case 50, a positive electrode terminal 70 and a negative electrode terminal 72 are provided for external connection. The positive electrode terminal 70 is electrically connected to the positive electrode 10 of the electrode body 40 through a positive electrode current collector plate 12c provided in the positive electrode active material layer non-forming portion 12n. The negative electrode terminal 72 is electrically connected to the negative electrode 20 of the electrode body 40 through a negative electrode current collector plate 22c provided in the negative electrode active material layer non-forming portion 22n.

The secondary battery 100 disclosed herein can be used for various applications and is characterized in that it includes the separator 30 such that overcharge resistance is improved compared to a battery of the related art. Accordingly, due to its characteristics, the secondary battery 100 can be preferably used, for example, as a high-capacity drive power supply mounted on a plug-in hybrid vehicle, a hybrid vehicle, an electric vehicle, or the like.

Hereinafter, several examples relating to the disclosure will be described, but the specific examples are not intended to limit the disclosure.

Test Example I

In this test example, a relationship between a porosity of a porous polyethylene layer and overcharge resistance was investigated. Specifically, first, as separators, five separator sheets (Examples 1 to 5) having a two-layer structure including a porous polyethylene layer (hereinafter, referred to a "PE layer") and a porous polypropylene layer (hereinafter, referred to as "PP layer") were prepared. The five separator sheets were only different from each other in the porosity of the PE layer. Characteristics of each of the layers constituting the separator are as follows.

PE layer: a layer including a polyethylene resin (melting point: 110° C.) and having a thickness of 1 μm and a porosity of 2% to 20%

PP layer: a layer including a polypropylene resin (melting point: 130° C.) and having a thickness of 10 μm and a porosity of 40%

Next, using each of the separator sheets (Examples 1 to 5), a lithium ion secondary battery was constructed. Specifically, a positive electrode sheet described below and a negative electrode sheet described below were laminated with the separator sheet interposed therebetween to obtain an electrode body. At this time, the components were disposed such that the PP layer of the separator sheet faced the positive electrode and the PE layer of the separator sheet faced the negative electrode. The obtained electrode body was accommodated in a battery case together with the following electrolytic solution. As a result, secondary batteries (Examples 1 to 5) were constructed. A temperature sensor was attached to an outer surface of the battery case of each of the constructed secondary batteries.

Positive electrode: a positive electrode sheet in which a positive electrode active material layer including a lithium transition metal composite oxide was formed on a surface of aluminum foil (positive electrode current collector)

Negative electrode: a negative electrode sheet in which a negative electrode active material layer including a carbon material (negative electrode active material) was formed on a surface of copper foil (negative electrode current collector)

Electrolytic solution: a solution in which $LiPF_6$ (supporting electrolyte) was dissolved in a mixed solvent including ethylene carbonate, dimethyl carbonate, and ethyl methyl carbonate at a volume ratio of 30:40:30

Next, the secondary batteries according to Examples 1 to 5 were charged to an overcharge state, and the maximum battery temperatures of the secondary batteries were compared to each other. Specifically, the secondary batteries were charged until the battery voltage reached 25 V. The maximum peak temperatures of the secondary batteries at this time were compared to each other. The results are shown in Table 1 and FIG. 3.

TABLE 1

| | Resin Substrate of Separator | | | Overcharge Test |
| --- | --- | --- | --- | --- |
| | Porosity of PE Layer (%) | Thickness of PE Layer (μm) | Thickness of PP Layer (μm) | Thickness Ratio PE/ (PE + PP) | Maximum Battery Temperature (° C.) |
| Example 1 | 2 | 1 | 10 | 0.091 | 100 |
| Example 2 | 5 | | | | 105 |
| Example 3 | 10 | | | | 121 |
| Example 4 | 15 | | | | 124 |
| Example 5 | 20 | | | | 128 |

Figure 3:
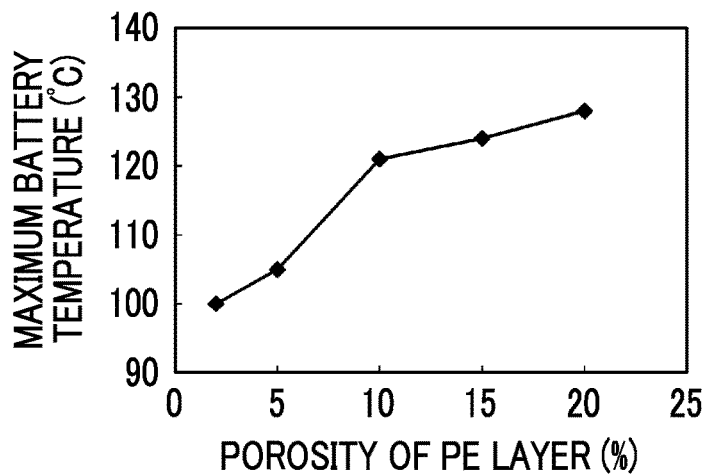
FIG. 3 is a graph showing a relationship between a porosity of a PE layer and a maximum battery temperature.

As shown in Table 1 and FIG. 3, as the porosity of the PE layer increases, the maximum battery temperature tends to increase. In particular, once the porosity of the PE layer exceeds 5%, this tendency becomes significant. In Examples 3 to 5 in which the porosity of the PE layer was 10% or higher, the maximum battery temperature was 120° C. or higher. On the other hand, in Examples 1 and 2 in which the porosity of the PE layer was 2% to 5%, the maximum battery temperature was 110° C. or lower, and an increase in the internal temperature of the battery during overcharging was suppressed as compared to Examples 3 to 5. The reason for this is presumed to be as follows. As the porosity of the PE layer decreased, the time taken to completely shut down the separator was able to be reduced, and the ion conduction between the positive and negative electrodes was able to be rapidly blocked. Based on this result, it was found that the porosity of the PE layer is preferably 5% or lower from the viewpoint of improving overcharge resistance. In addition, it was found that, in a case where the porosity of the PE layer is 2% or higher, the interconnection properties of the separator can be secured.

Test Example II

In this test example, a relationship between overcharge resistance and a ratio (thickness ratio) of the thickness of the porous polyethylene layer (PE layer) to the total thickness of the resin substrate was investigated. Specifically, lithium ion secondary batteries (Examples 6 to 11) were constructed using the same method as in Example 2 of Test Example I, except that separators (Examples 6 to 11) having thickness ratios shown in Table 2 were used, respectively. Next, these lithium ion secondary batteries were charged to 25 V in an overcharge test. The results are shown in Table 2 and FIG. 4. "Thickness Ratio" in Table 2 refers to the ratio of the thickness of the PE layer to the total thickness of the resin substrate, and the values thereof are rounded off to three decimal places.

TABLE 2

| | Resin Substrate of Separator | | | | Overcharge Test |
| --- | --- | --- | --- | --- | --- |
| | Porosity of PE Layer (%) | Thickness of PE Layer (μm) | Thickness of PP Layer (μm) | Thickness Ratio PE/ (PE + PP) | Maximum Battery Temperature (° C.) |
| Example 6 | 5 | 0.5 | 10 | 0.048 | 106 |
| Example 7 | | 1.0 | | 0.091 | 105 |
| Example 8 | | 1.5 | | 0.130 | 111 |
| Example 9 | | 2.0 | | 0.167 | 121 |
| Example 10 | | 2.5 | | 0.200 | 124 |
| Example 11 | | 3.0 | | 0.231 | 132 |

Figure 4:
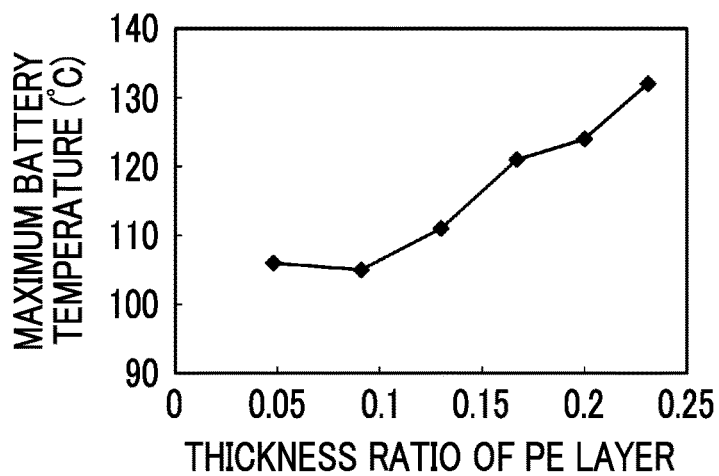
FIG. 4 is a graph showing a relationship between a thickness ratio of a PE layer and a maximum battery temperature.

As shown in Table 2 and FIG. 4, as the thickness ratio of the PE layer increases, the maximum battery temperature tends to increase. In particular, once the thickness ratio of the PE layer exceeds 0.091, this tendency becomes significant. In Examples 8 to 11 in which the thickness ratio of the PE layer was 0.130 or higher, the maximum battery temperature was 110° C. or higher. On the other hand, in Examples 6 and 7 in which the thickness ratio of the PE layer was 0.048 to 0.091, the maximum battery temperature was 110° C. or lower, and an increase in the internal temperature of the battery during overcharging was suppressed as compared to Examples 8 to 11. The reason for this is presumed to be as follows. As the thickness ratio of the PE layer decreased, the time taken to completely shut down the separator was able to be reduced. Based on this result, it was found that the thickness ratio of the PE layer is preferably 0.048 to 0.091 from the viewpoint of improving overcharge resistance.

Test Example III

In this test example, a relationship between overcharge resistance and the absolute thicknesses of the porous polyethylene layer (PE layer) and the porous polypropylene layer (PP layer) was investigated. Specifically, lithium ion secondary batteries (Examples 12 to 15) were constructed using the same method as in Example 2 of Test Example I, except that separators (Examples 12 to 15) having thicknesses shown in Table 3 were used, respectively. Next, these lithium ion secondary batteries were charged to 25 V in an overcharge test. The results are shown in Table 3 and FIG. 5.

TABLE 3

| | Resin Substrate of Separator | | | Overcharge Test |
|---|---|---|---|---|
| | Porosity of PE Layer (%) | Thickness of PE Layer (μm) | Thickness of PP Layer (μm) | Thickness Ratio PE/ (PE + PP) | Maximum Battery Temperature (° C.) |
| Example 12 | 5 | 0.5 | 5 | 0.091 | 110 |
| Example 13 | | 1.0 | 10 | | 105 |
| Example 14 | | 1.5 | 15 | | 106 |
| Example 15 | | 2.0 | 20 | | 108 |

Figure 5:
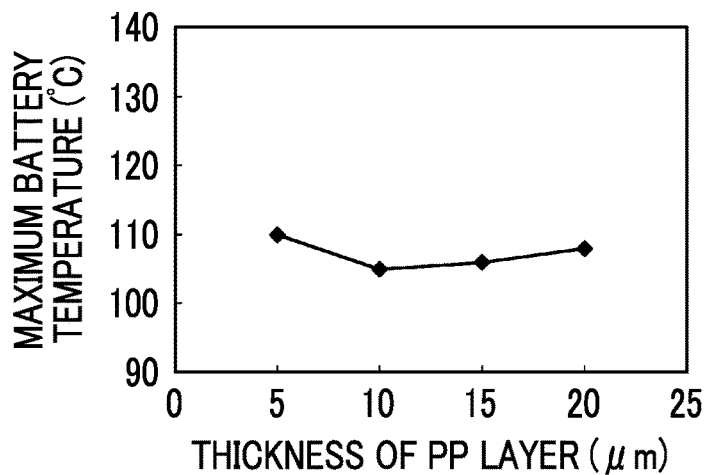
FIG. 5 is a graph showing a relationship between a thickness of a PP layer and a maximum battery temperature.

As shown in Table 3 and FIG. 5, in Examples 12 to 15, although the absolute thicknesses of the PE layer and the PP layer was changed, the maximum battery temperature was 110° C. or lower, and an increase in the internal temperature of the battery during overcharging was suppressed.

As clearly seen from the above result, with the technique disclosed herein, a secondary battery having superior overcharge resistance in which an increase in the internal temperature of the battery is suppressed can be realized.

Hereinabove, the disclosure has been described in detail, but the above-described embodiments and examples are merely exemplary. The disclosure disclosed herein includes various modifications and alternations of the above-described specific examples.

What is claimed is:

1. A secondary battery comprising:
   an electrode body including
      a positive electrode,
      a negative electrode, and
      a separator interposed between the positive electrode and the negative electrode; and
   an electrolytic solution,
   wherein the separator includes a resin substrate that has a multi-layer structure including a porous polyethylene layer and a porous resin layer, the porous polyethylene layer including a polyethylene resin and being disposed adjacent to the negative electrode, and the porous resin layer including a resin having a higher melting point than the polyethylene resin,
   wherein a porosity of the porous polyethylene layer is 2% to 5%, and
   wherein a ratio of a thickness of the porous polyethylene layer to a total thickness of the resin substrate is 0.048 to 0.091.

2. The secondary battery according to claim 1, wherein the porous resin layer is a porous polypropylene layer, and
   wherein the resin substrate has a two-layer structure including the porous polyethylene layer and the porous polypropylene layer.

3. The secondary battery according to claim 1, wherein the total thickness of the resin substrate is 5.5 μm to 22 μm.

4. The secondary battery according to claim 1, wherein a porosity of the porous resin layer is higher than the porosity of the porous polyethylene layer.

5. The secondary battery according to claim 1, wherein the porous resin layer has a melting point of about 100° C. or higher and about 200° C. or lower.

6. The secondary battery according to claim 5, wherein the porous resin layer has a melting point of about 150° C. or higher and about 200° C. or lower.

7. The secondary battery according to claim 1, wherein the porous polyethylene layer has a melting point of about 70° C. or higher and 130° C. or lower.

8. The secondary battery according to claim 7, wherein the porous polyethylene layer has a melting point of about 80° C. or higher and 130° C. or lower.

9. The secondary battery according to claim 1, wherein the porous resin layer is disposed adjacent to the positive electrode.

* * * * *